(12) United States Patent
Hou et al.

(10) Patent No.: US 7,597,726 B2
(45) Date of Patent: Oct. 6, 2009

(54) MANNICH DETERGENTS FOR HYDROCARBON FUELS

(75) Inventors: Peter W. Hou, Chesterfield, VA (US); Dennis J. Malfer, Glen Allen, VA (US); May Duffield Thomas, Richmond, VA (US); William J. Colucci, Glen Allen, VA (US)

(73) Assignee: Afton Chemical Corporation, Richmond, VA (US)

( * ) Notice: Subject to any disclaimer, the term of this patent is extended or adjusted under 35 U.S.C. 154(b) by 398 days.

(21) Appl. No.: 11/336,037

(22) Filed: Jan. 20, 2006

(65) Prior Publication Data

US 2007/0169408 A1   Jul. 26, 2007

(51) Int. Cl.
*C10L 1/22* (2006.01)
*C07C 211/33* (2006.01)

(52) U.S. Cl. .............. 44/415; 44/447; 44/459; 564/305; 564/306; 564/336

(58) Field of Classification Search ............... 44/415; 564/451, 452
See application file for complete search history.

(56) References Cited

U.S. PATENT DOCUMENTS

| | | | |
|---|---|---|---|
| 4,169,846 A | 10/1979 | Kidani et al. | |
| 4,482,464 A | 11/1984 | Karol et al. | |
| 4,636,322 A | 1/1987 | Nalesnik | |
| 4,668,412 A | 5/1987 | Hart | |
| 4,699,724 A | 10/1987 | Nalesnik | |
| 4,767,553 A | 8/1988 | Hart | |
| 4,941,985 A | 7/1990 | Benfaremo | |
| 5,066,764 A * | 11/1991 | Casey et al. ............... | 528/122 |
| 5,409,623 A | 4/1995 | Mishra | |
| 5,523,417 A | 6/1996 | Blackborow | |
| 5,634,951 A * | 6/1997 | Colucci et al. ............ | 44/415 |
| 5,703,023 A | 12/1997 | Srinivasan | |
| 5,725,612 A | 3/1998 | Malfer et al. | |
| 5,837,773 A | 11/1998 | Olivier | |
| 5,871,590 A | 2/1999 | Hei | |
| 5,876,468 A | 3/1999 | Moreton | |
| 6,025,308 A | 2/2000 | Matsuya et al. | |
| 6,048,373 A * | 4/2000 | Malfer et al. ............. | 44/415 |
| 6,107,257 A | 8/2000 | Valcho | |
| 6,107,258 A | 8/2000 | Esche, Jr. et al. | |
| 6,117,825 A | 9/2000 | Liu | |
| 6,179,885 B1 | 1/2001 | McAtee | |
| 6,255,261 B1 | 7/2001 | Liesen | |
| 6,323,164 B1 | 11/2001 | Liesen | |
| 6,458,172 B1 | 10/2002 | Macduff et al. | |
| 6,511,518 B1 | 1/2003 | Houser | |
| 6,511,519 B1 | 1/2003 | Ahmadi et al. | |
| 6,733,551 B2 | 5/2004 | Carabell et al. | |
| 6,797,021 B2 | 9/2004 | Puri et al. | |
| 6,800,103 B2 | 10/2004 | Malfer et al. | |
| 6,869,919 B2 | 3/2005 | Ritchie | |
| 6,974,535 B2 | 12/2005 | Cody | |
| 2003/0014910 A1 * | 1/2003 | Aradi et al. .............. | 44/415 |
| 2003/0029077 A1 | 2/2003 | Jackson et al. | |
| 2004/0168364 A1 | 9/2004 | Macduff et al. | |
| 2005/0044779 A1 | 3/2005 | Schwahn et al. | |
| 2005/0268538 A1 | 12/2005 | Malfer et al. | |

FOREIGN PATENT DOCUMENTS

| | | |
|---|---|---|
| CA | 2386279 A1 | 4/2001 |
| CA | 2386281 A1 | 4/2001 |
| EP | 0274589 B1 | 7/1988 |
| EP | 0 909 805 A1 | 4/1999 |
| EP | 0909805 A1 | 4/1999 |
| EP | 1 277 828 A2 | 1/2003 |
| EP | 1602707 A1 | 7/2005 |
| EP | 1 602 707 A1 | 12/2005 |
| WO | 00/78898 A1 | 12/2000 |
| WO | WO 00/78898 A1 | 12/2000 |
| WO | 01/25294 A1 | 4/2001 |
| WO | WO 01/25294 A1 | 4/2001 |
| WO | 2005/047348 A1 | 5/2005 |
| WO | WO 2005/47348 A1 | 5/2005 |

* cited by examiner

*Primary Examiner*—Ellen M McAvoy
*Assistant Examiner*—Chantel Ferguson-Graham
(74) *Attorney, Agent, or Firm*—Fitch, Even, Tabin & Flannery; Dennis Rainear

(57) ABSTRACT

New, highly effective Mannich detergents for use in hydrocarbon fuels are described which reduce engine deposits in spark and compression ignition internal combustion engines. They are Mannich condensation reaction products obtained from reacting: (i) a polyamine having a sterically-hindered primary amino group, (ii) a hydrocarbyl-substituted hydroxyaromatic compound, and (iii) an aldehyde. These Mannich detergent compounds may be dispersed in a liquid carrier to provide a fuel additive concentrate for hydrocarbon engine fuels which effectively control engine deposit formation in intake valves and also other engine regions such as port fuel injectors and combustion chambers.

17 Claims, No Drawings

MANNICH DETERGENTS FOR HYDROCARBON FUELS

FIELD OF THE INVENTION

This invention relates to novel Mannich base condensation products and fuel compositions comprising said Mannich products that are effective in controlling engine deposits in internal combustion engines.

BACKGROUND OF THE INVENTION

Deposits tend to build up inside an engine unless gasoline contains effective deposit control additives. Since most base gasolines are formulated to similar regulated specifications, the performance of the deposit control additives can be very important in differentiating different gasoline brands from a performance standpoint. Over the years considerable work has been devoted to developing additives for controlling (preventing or reducing) deposit formation, particularly in the fuel induction systems of spark-ignition internal combustion engines.

Additives that can effectively control engine deposits have been the focus of considerable research activities in the field, yet further improvements are desired.

SUMMARY OF THE INVENTION

The invention provides Mannich reaction products having robust detergency properties in hydrocarbon fuels effective to provide improved deposit control in spark and compression ignition internal combustion engines. These detergent compounds are provided as Mannich condensation reaction products of: (i) a polyamine having a sterically-hindered primary amino group, (ii) a hydrocarbyl-substituted hydroxyaromatic compound, and (iii) an aldehyde.

An important feature of this invention is the use of polyamines having a sterically-hindered primary amino group in the molecule which is incapable of or essentially incapable of entering into the Mannich condensation reaction with the hydrocarbyl-substituted hydroxyaromatic compound and the aldehyde. As a result, the finished Mannich reaction products retain substantial unreacted primary amine content. This retention of a significant amount of unreacted primary amine content in the Mannich reaction products has been discovered to translate into improved detergency properties imparted to hydrocarbon fuels treated with the Mannich reaction products of this invention. These Mannich reaction products provide not only improved control of intake valve deposits, but also improved deposit control in "cooler" engine regions, in spark-ignition or compression internal combustion engines. For instance, in addition to intake valve control, they also have been discovered to be effective in controlling (i.e., preventing and/or reducing) port fuel injector plugging or direct injector deposits, combustion chamber deposits, and intake port stains. Mannich reaction products of the invention meet and pass not only industry deposit control performance tests concerning intake valves, but also industry tests pertaining to port fuel injectors (viz., ASTM D-6421, PFI rig tests), which compares well with comparison Mannich detergents which have failed the PFI rig test.

In one embodiment, the polyamine react having the sterically-hindered primary amino group used in the Mannich reaction may be selected from (A) aliphatic cyclic polyamines having a sterically-hindered primary amino group, and (B) acyclic aliphatic polyamines having a sterically-hindered primary amino group, or combinations thereof.

In one particular embodiment, the Mannich reaction product is obtained by reacting (1) 1,2-diaminocyclohexane, (2) polyisobutylene-substituted cresol and/or phenol, and (3) formaldehyde. In a more particular embodiment, the reactants (1), (2) and (3) are used in approximately equimolar proportions in the Mannich reaction. The Mannich reaction products may be dispersed in a liquid carrier to provide a fuel additive concentrate for hydrocarbon engine fuels.

Still another embodiment includes fuels for spark ignition and compression engines into which have been blended the various Mannich reaction products and/or additive concentrates of this invention described herein, and methods for controlling (i.e., preventing or reducing) engine valve deposits in a myriad of engine locations including one or more of the intake valves, the port fuel injectors, gasoline direct injectors, the combustion chambers, port fuel stain, and so forth, in an internal combustion engine by fueling and/or operating the engine with a fuel composition of this invention. Other embodiments and features of this invention will become still further apparent from the ensuing description and appended claims.

DETAILED DESCRIPTION OF THE PREFERRED EMBODIMENTS

Mannich Reaction Product. Detergent compounds useful as deposit control additives in engine fuels are provided comprising the Mannich condensation reaction product of:

(i) a polyamine having a sterically-hindered primary amino group, (ii) a hydrocarbyl-substituted hydroxyaromatic compound, and (iii) an aldehyde.

Polyamine with Sterically-Hindered Amine Group: The polyamine reactant used in the Mannich reaction is a polyamine which has an amino group that does not participate in the Mannich condensation reaction with the hydrocarbyl-substituted hydroxyaromatic reactant and aldehyde. As will be understood, the polyamine also must have a separate suitably reactive amino group in the same molecule for purposes of supporting the Mannich reaction. The reactive amino group may be a primary or secondary amino group in the molecule. In a particular embodiment, the reactive amino group is a non-sterically hindered reactive primary amino group.

In one embodiment, the polyamine useful for a Mannich reaction additionally has a primary amino group that is physically sterically-protected to prevent or least significantly hinder its ability to participate in the Mannich reaction.

Polyamines having such steric hindrance provided on one primary amino group of the molecule may be selected from aliphatic cyclic (alicyclic) polyamines and acylic aliphatic polyamines having this feature.

In one embodiment, polyamines having a reactive amino group and a sterically-hindered primary amino group have the following general structure (A):

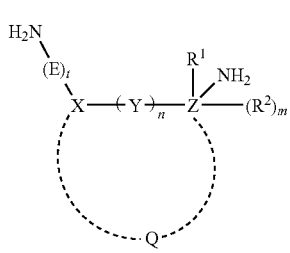

(A)

wherein X and Z each is methylene, Y is an alkylene or alkyleneamino, n is 0 or 1, Q is an optional alkylene group suitable for forming a ring structure with X and Z, E is a hydrocarbyl group, t is 0 or 1, $R^1$ is a hydrocarbyl group or hydrogen provided that $R^1$ is hydrocarbyl if n is 1, $R^2$ is hydrogen or a hydrocarbyl group, m is 0 or 1 provided that m is 0 if Q is present. If $R^1$ and/or $R^2$ is hydrocarbyl, it particularly may be $C_1$ to $C_8$ alkyl such as methyl, ethyl, propyl, isopropyl, t-butyl, and so forth. Where n is 1, Y may be, for example, $C_1$ to $C_8$ alkylene, or may be an alkyleneamino radical such as methyleneamino (—$CH_2N(H)$—), dimethyleneamino (—$CH_2N(H)$—$CH_2$—), methyleneamino-ethylenemethyleneamino (—$CH_2N(H)$—$C_2H_4N(H)$—$CH_2$—), and so forth. Where t is 1, E may be methylene, ethylene, isopropylene, and so forth. Q may be an alkylene chain, such as a $C_2$-$C_4$ alkylene chain.

In one embodiment, the polyamines having a sterically hindered primary amino group comprise aliphatic cyclic polyamines, particularly polyaminocycloalkanes, and more particularly polyaminocyclohexanes. As illustrated below, the polyaminocyclohexanes may comprise 1,2-diaminodicyclohexanes, 1,3-diaminodicyclohexanes, and 1,4-diaminodicyclohexanes, such as those having the following exemplary, non-limiting structures:

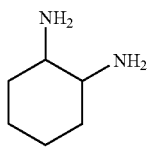

a1

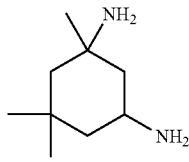

a2

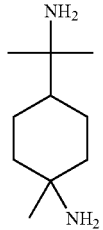

a3

In one particular embodiment of the aliphatic cyclic polyamine structures, a sterically hindering hydrocarbyl group generally is bonded to the same carbon atom from which the sterically-hindered primary amino group is bonded when the hindered/protected and reactive amino groups are present in an arrangement other than an ortho configuration relative to each other. As illustrated in structure a3, a reactive amino group in the compound need not be directly bonded to the ring structure, and may be present as a moiety of an intervening substituent that is directly attached to the ring structure.

1,2-diaminodicyclohexanes, for example, are commercially available as a mixture of trans-d-, a trans-l-, and a cis-isomer. The trans-d- and trans-l-isomers thereof are optical isomers and the cis-isomer thereof is a geometrical isomer. Isolated or pure isomer forms thereof also may be used as this reactant.

Representative acyclic aliphatic polyamine reactants include alkylene polyamines having a primary amino group that is physically sterically-protected to prevent or least significantly hinder its ability to participate in the Mannich condensation reaction. The sterically hindered primary amino group generally is attached to either a secondary or tertiary carbon atom in the polyamine compound. The acyclic aliphatic polyamine also must have a separate suitably reactive amino group in the same molecule for supporting the Mannich reaction. The reactive amino group may be a primary or secondary amino group in the molecule. Other substituents such as hydroxyl, cyano, amido, etc., also can be present in the polyamine.

Acyclic aliphatic polyamines having a sterically hindered primary amino group include those having the following exemplary, non-limiting structures:

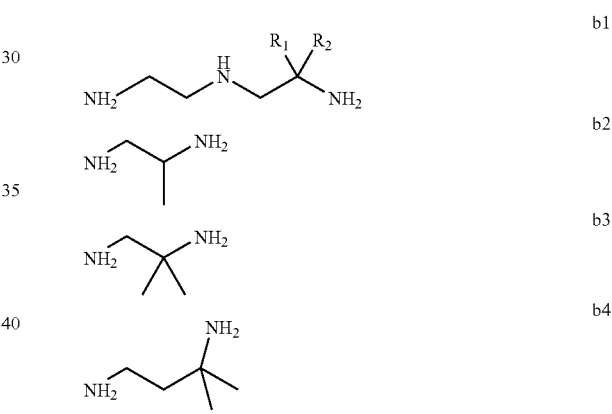

wherein $R_1$ and $R_2$ are a hydrocarbyl group or hydrogen provided that at least one thereof is a hydrocarbyl group. The hydrocarbyl group may be $C_1$ to $C_8$ alkyl such as methyl, ethyl, propyl, isopropyl, and so forth.

Hydrocarbyl-Substituted Hydroxyaromatic Compound. Representative hydrocarbyl-substituted hydroxyaromatic compounds which can be used in forming the Mannich detergent products of the present invention are represented by the following formula:

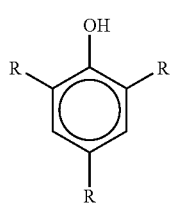

in which each R is H, $C_{1-4}$ alkyl, or a hydrocarbyl substituent having an average molecular weight ($M_w$) in the range of about 300 to about 2,000, particularly about 500 to about 1,500, as determined gel permeation chromatography (GPC), with the proviso that at least one R is H and one R is a hydrocarbyl substituent as defined above.

Representative hydrocarbyl substituents include polyolefin polymers, such as polypropylene, polybutene, polyisobutylene, and ethylene alpha-olefin copolymers. Other similar long-chain hydrocarbyl substituents may also be used. Examples include copolymers of butylene and/or isobutylene and/or propylene, and one or more mono-olefinic comonomers copolymerizable therewith (e.g., ethylene, 1-pentene, 1-hexene, 1-octene, 1-decene, etc.) where the copolymer molecule contains at least 50% by weight, of butylene and/or isobutylene and/or propylene units. The comonomers polymerized with propylene or such butenes may be aliphatic and can also contain non-aliphatic groups, e.g., styrene, o-methylstyrene, p-methylstyrene, divinyl benzene and the like. Thus in any case the resulting polymers and copolymers used in forming the alkyl-substituted hydroxyaromatic compound are substantially aliphatic hydrocarbon polymers. Polyolefin polymer hydrocarbyl substituents can have at least 20%, particularly at least 50%, and more particularly at least 70% of their olefin double bonds at a terminal position on the carbon chain as the highly reactive vinylidene isomer.

Polybutylene is particularly useful. Unless otherwise specified herein, the term "polybutylene" is used in a generic sense to include polymers made from "pure" or "substantially pure" 1-butene or isobutene, and polymers made from mixtures of two or all three of 1-butene, 2-butene and isobutene. Commercial grades of such polymers may also contain insignificant amounts of other olefins.

Polyisobutylene also is especially useful. So-called high reactivity polyisobutenes having relatively high proportions of polymer molecules having a terminal vinylidene group, i.e. at least 20% of the total terminal olefinic double bonds in the polyisobutene comprise an alkylvinylidene isomer, preferably at least 50% and more preferably at least 70%, formed by methods such as described, for example, in U.S. Pat. No. 4,152,499 and W. German Offenlegungsschrift 29 04 314, are preferred polyalkenes for use in forming the hydrocarbyl substituted hydroxyaromatic reactant. Also suitable for use in forming the long chain substituted hydroxyaromatic reactants of the present invention are ethylene alpha-olefin copolymers having a number average molecular weight of 500 to 3000, wherein at least about 30% of the polymer's chains contain terminal ethylidene unsaturation.

In one embodiment, the hydrocarbyl-substituted hydroxyaromatic compound has one R that is H, one R is $C_{1-4}$ alkyl, and one R is a hydrocarbyl substituent having an average molecular weight in the range of about 300 to about 2,000. By using a substituted hydroxyaromatic compound which has only one site for the Mannich reaction to occur, i.e., only one ortho- or para-position being unsubstituted (i.e., where one R=H) in combination with an amine group, but not all primary amine groups, on a sterically-hindered polyamine as defined herein, Mannich detergent products are obtained that are very effective at reducing engine deposits in different regions of an internal combustion engine. Further, the Mannich base products of the present invention generally can be made in higher yields compared to products made from a hydroxyaromatic compounds substituted in only one position (for example, hydroxyaromatic compounds where one R is a hydrocarbyl substituent and two R's are H such as a hydrocarbyl-substituted phenol).

In one particular embodiment, the hydrocarbyl-substituted hydroxyaromatic compound can be obtained by alkylating o-cresol with a high molecular weight hydrocarbyl polymer, such as a hydrocarbyl polymer group having an average molecular weight between about 300 to about 2,000, to provide an alkyl-substituted cresol. In a more particular embodiment, o-cresol is alkylated with polyisobutylene having an average molecular weight between about 300 to about 2,000 to provide a polyisobutylene-substituted cresol. In a most particular embodiment, o-cresol is alkylated with polyisobutylene (PIB) having an average molecular weight between about 500 to about 1,500 to provide a polyisobutylene-substituted cresol (PIB-cresol).

In another particular embodiment, the hydrocarbyl-substituted hydroxyaromatic compound can be obtained by alkylating o-phenol with a high molecular weight hydrocarbyl polymer, such as a hydrocarbyl polymer group having an average molecular weight between about 300 to about 2,000, to provide an alkyl-substituted phenol. In a particular embodiment, o-cresol is alkylated with polybutylene having an average molecular weight between about 500 to about 1,500 to provide a polybutylene-substituted cresol.

However, any hydrocarbyl-substituted hydroxyaromatic compound readily reactive in the Mannich condensation reaction may be employed. The hydrocarbyl substituents may contain some residual unsaturation, but in general, are substantially saturated.

The alkylation of the hydroxyaromatic compound is typically performed in the presence of an alkylating catalyst, such as a Lewis acid catalyst (e.g., $BF_3$ or $AlCl_3$), at a temperature in the range of about 30 to about 200° C. For a polyolefin used as the hydrocarbyl substituent, it preferably has a polydispersity in the range of about 1 to about 4, preferably from about 1 to about 2, as determined by GPC. Suitable methods of alkylating the hydroxyaromatic compounds of the present invention are generally well known in the art, for example, as taught in GB 1,159,368 and U.S. Pat. Nos. 4,238,628; 5,300,701 and 5,876,468.

Aldehyde. Representative aldehydes for use in the preparation of the Mannich base products include aliphatic aldehydes and aromatic aldehydes. The aliphatic aldehydes include $C_1$ to $C_6$ aldehydes, such as formaldehyde, acetaldehyde, propionaldehyde, butyraldehyde, valeraldehyde, and hexanal aldehyde. Aromatic aldehydes which may be used include, e.g., benzaldehyde and salicylaldehyde. Illustrative heterocyclic aldehydes for use herein are furfural and thiophene aldehyde, etc. Also useful are formaldehyde-producing reagents such as paraformaldehyde, or aqueous formaldehyde solutions such as formalin. Most preferred is formaldehyde and formalin.

Synthesis of Mannich Reaction Product. To prepare the Mannich products of the invention, a condensation reaction among the polyamine, the hydrocarbyl-substituted hydroxyaromatic compound, and the aldehyde may be conducted at a temperature in the range of about 40° to about 200° C. The reaction can be conducted in bulk (no diluent or solvent) or in a solvent or diluent. Water is evolved and can be removed by azeotropic distillation during the course of the reaction. Typical reaction times range from 2 to 4 hours, although longer or shorter times can be used as necessary.

Another important feature of this invention is the proportions of the reactants in the Mannich condensation reaction mixture. General proportions of Mannich reactants (i), (ii) and (iii) are from: (i) 0.6 to 1.4 mole part(s) of the polyamine having the sterically-hindered primary amino group, (ii) 0.6 to 1.4 mole part(s) of alkyl-substituted hydroxyaromatic compound, and (iii) 0.6 to 1.4 mole part(s) of at least one aldehyde; particularly a mole ratio of (i):(ii):(iii) of 0.8-1.2: 0.8-1.2:0.8-1.2; and more particularly 0.9-1.1:0.9-1.1:0.9-1.1. Use of approximately equimolar proportions of the three Mannich reaction reactants is preferred. If less than 1 mole of polyamine and aldehyde are used per mole of hydroxyaromatic compound some hydroxyaromatic compound will remain unreacted and the Mannich product will not be as active. If higher ratios of polyamine and/or aldehyde are used, undesired byproducts may form or unreacted polyamine or aldehydes may be present in the finished product or stripped from the reaction mixture resulting in a waste of starting materials. The use of the above-specified reactant proportions together with the use of the type of polyamines described herein has been shown to result in the provision of novel Mannich base products having excellent performance capabilities and physical properties.

When performing the reactions on a laboratory scale the foregoing ratios are relatively easy to maintain and control. However, when performing the reaction in large scale plant reactors, the possibility of losses of the more volatile reactants (polyamine and formaldehyde) can be encountered, as by vaporization into the reactor headspace, entrainment in purge streams as water is being purged from the reaction mixture, etc. Thus when conducting the reaction on a large scale care should be exercised to compensate for any such losses so that the liquid reaction mixture actually contains the reactants in the proportions utilized pursuant to this invention.

Additive Concentrates and Fuel Compositions. The Mannich products of this invention are preferably used in combination with a liquid carrier, induction aid or fluidizer. Such carriers can be of various types, such as for example liquid poly-α-olefin oligomers, liquid polyalkene hydrocarbons (e.g., polypropene, polybutene, polyisobutene, or the like), liquid hydrotreated polyalkene hydrocarbons (e.g., hydrotreated polypropene, hydrotreated polybutene, hydrotreated polyisobutene, or the like), mineral oils, liquid poly(oxyalkylene) compounds, liquid alcohols or polyols, liquid esters, and similar liquid carriers or solvents. Mixtures of two or more such carriers or solvents can be employed.

Carrier. The Mannich products of this invention are preferably used in combination with a liquid carrier, induction aid or fluidizer. Such carriers can be of various types, such as for example liquid poly-α-olefin oligomers, liquid polyalkene hydrocarbons, liquid hydrotreated polyalkene hydrocarbons, mineral oils, liquid poly(oxyalkylene) compounds, liquid alcohols or polyols, liquid esters, and similar liquid carriers or solvents. Mixtures of two or more such carriers or solvents can be employed.

Particular liquid carriers for the Mannich detergents described herein include 1) a mineral oil or a blend of mineral oils, particularly those having a viscosity index of less than about 120, 2) one or a blend of poly-α-olefin oligomers, particularly those having an average molecular weight of about 500 to 1500, 3) polyethers, particularly poly(oxyalkylene) compounds having an average molecular weight in the range of about 500 to about 1500, 4) one or more liquid polyalkylenes, or 5) mixtures of any of 1), 2), 3), and/or 4). Although not limited thereto, these carriers have particularly desirable performance capabilities.

The mineral oil carriers that can be used include paraffinic, naphthenic and asphaltic oils, and can be derived from various petroleum crude oils and processed in any suitable manner. For example, the mineral oils may be solvent extracted or hydrotreated oils. Reclaimed mineral oils can also be used. Hydrotreated oils are the most preferred. Preferably the mineral oil used has a viscosity at 40° C. of less than about 1600 SUS, and more preferably between about 300 and 1500 SUS at 40° C. Paraffinic mineral oils most preferably have viscosities at 40° C. in the range of about 475 SUS to about 700 SUS. For best results it is highly desirable that the mineral oil have a viscosity index of less than about 100, more preferably, less than about 70 and most preferably in the range of from about 30 to about 60.

The poly-α-olefins (PAO) carriers that can be used include hydrotreated and unhydrotreated poly-α-olefin oligomers, i.e., hydrogenated or unhydrogenated products, primarily trimers, tetramers and pentamers of α-olefin monomers, which monomers contain from 6 to 12, generally 8 to 12 and most preferably about 10 carbon atoms. Their synthesis is outlined in Hydrocarbon Processing, February 1982, page 75 et seq., and in U.S. Pat. Nos. 3,763,244; 3,780,128; 4,172,855; 4,218,330; and 4,950,822. The usual process essentially comprises catalytic oligomerization of short chain linear alpha olefins (suitably obtained by catalytic treatment of ethylene). The poly-α-olefins used as carriers will usually have a viscosity (measured at 100 degrees C.) in the range of 2 to 20 centistokes (cSt). Preferably, the poly-α-olefin has a viscosity of at least 8 cSt, and most preferably about 10 cSt at 100 degrees C. Particularly desirable poly-α-olefins (PAO) include polybutene having an average molecular weight of about 500 to about 1500, and more particularly polyisobutene and/or hydrotreated polyisobutene having an average molecular weight of about 500 to about 1500.

Polyethers that can be used as the carrier are poly(oxyalkylene) compounds having an average molecular weight between about 500 and about 1500, and particularly may include poly(oxyalkylene) compounds which are fuel-soluble compounds which can be represented by the following formula:

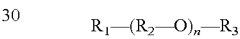

wherein $R_1$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, $R_2$ is an alkylene group having 2-10 carbon atoms (preferably 2-4 carbon atoms), $R_3$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, and n is an integer from 1 to 500 and preferably in the range of from 3 to 120 representing the number (usually an average number) of repeating alkyleneoxy groups. In compounds having multiple —$R_2$—O— groups, $R_2$ can be the same or different alkylene group and where different, can be arranged randomly or in blocks. Preferred poly(oxyalkylene) compounds are monools comprised of repeating units formed by reacting an alcohol with one or more alkylene oxides, preferably one alkylene oxide.

The average molecular weight of the poly(oxyalkylene) compounds used as carrier fluids is preferably in the range of from about 500 to about 3000, more preferably from about 750 to about 2500, and most preferably from above about 1000 to about 2000.

One useful sub-group of poly(oxyalkylene) compounds is comprised of the hydrocarbyl-terminated poly(oxyalkylene) monools such as are referred to in the passage at column 6, line 20 to column 7 line 14 of U.S. Pat. No. 4,877,416 and references cited in that passage, said passage and said references being incorporated herein by reference as if fully set forth.

A preferred sub-group of poly(oxyalkylene) compounds is comprised of one or a mixture of alkylpoly(oxyalkylene) monools which in its undiluted state is a gasoline-soluble liquid having a viscosity of at least about 70 centistokes (cSt) at 40° C. and at least about 13 cSt at 100° C. Of these compounds, monools formed by propoxylation of one or a mixture of alkanols having at least about 8 carbon atoms, and more preferably in the range of about 10 to about 18 carbon atoms, are particularly preferred.

The poly(oxyalkylene) carriers used in the practice of this invention preferably have viscosities in their undiluted state of at least about 60 cSt at 40° C. (more preferably at least about 70 cSt at 40° C.) and at least about 11 cSt at 100° C. (more preferably at least about 13 cSt at 100° C.). In addition, the poly(oxyalkylene) compounds used in the practice of this invention preferably have viscosities in their undiluted state of no more than about 400 cSt at 40° C. and no more than about 50 cSt at 100° C. More preferably, their viscosities will not exceed about 300 cSt at 40° C., and will not exceed about 40 cSt at 100° C. The most preferred poly(oxyalkylene) compounds will have viscosities of no more than about 200 cSt at 40° C., and no more than about 30 cSt at 100° C.

Preferred poly(oxyalkylene) compounds are poly(oxyalkylene) glycol compounds and monoether derivatives thereof that satisfy the above viscosity requirements and that are comprised of repeating units formed by reacting an alcohol or polyalcohol with an alkylene oxide, such as propylene oxide and/or butylene oxide with or without use of ethylene oxide, and especially products in which at least 80 mole % of the oxyalkylene groups in the molecule are derived from 1,2-propylene oxide. Details concerning preparation of such poly(oxyalkylene) compounds are referred to, for example, in Kirk-Othmer, Encyclopedia of Chemical Technology, Third Edition, Volume 18, pages 633-645 (Copyright 1982 by John Wiley & Sons), and in references cited therein, the foregoing excerpt of the Kirk-Othmer encyclopedia and the references cited therein being incorporated herein in toto by reference. U.S. Pat. Nos. 2,425,755; 2,425,845; 2,448,664; and 2,457,139 also describe such procedures, and are also incorporated herein by reference as if fully set forth herein.

A particularly preferred sub-group of poly(oxyalkylene) compounds is comprised of one or a mixture of alkylpoly(oxyalkylene)monools which in its undiluted state is a gasoline-soluble liquid having a viscosity of at least about 70 centistokes (cSt) at 40° C. and at least about 13 cSt at 100° C. Typically the maximum viscosities at these temperatures are no more than about 400 cSt at 40° C., and no more than about 50 cSt at 100° C. More preferably, their viscosities will not exceed about 300 cSt at 40° C. and will not exceed about 40 cSt at 100° C. The most preferred poly(oxyalkylene) compounds will have viscosities of no more than about 200 cSt at 40° C., and no more than about 30 cSt at 100° C. Of these compounds, monools formed by propoxylation of one or a mixture of alkanols having at least about 8 carbon atoms, and more preferably in the range of about 10 to about 18 carbon atoms, are particularly preferred.

The poly(oxyalkylene) compounds used pursuant to this invention will contain a sufficient number of branched oxyalkylene units (e.g., methyldimethyleneoxy units and/or ethyldimethyleneoxy units) to render the poly(oxyalkylene) compound gasoline soluble.

Another group of carrier fluids is the liquid polyalkylenes such as polypropenes, polybutenes, polyisobutenes, polyamylenes, copolymers of propene and butene, copolymers of butene and isobutene, copolymers of propene and isobutene and copolymers of propene, butene and isobutene, or their mixtures. Other useful polyalkylenes include hydrotreated polypropene, hydrotreated polybutene, hydrotreated polyisobutene, or the like. Preferred polyalkylene carrier fluids include polybutenes having a molecular weight distribution of less than 1.4 as taught in U.S. Pat. No. 6,048,373. Use of materials of this general type together with other carrier fluids is described for example, in U.S. Pat. Nos. 5,089,028 and 5,114,435, the disclosures of which are incorporated herein by reference.

In some cases, the Mannich base detergent/dispersant can be synthesized in the carrier fluid. In other instances, the preformed detergent/dispersant is blended with a suitable amount of the carrier fluid. If desired, the detergent/dispersant can be formed in a suitable solvent or carrier fluid and then blended with an additional quantity of the same or a different carrier fluid.

The proportion of the liquid carrier used relative to the Mannich base in the preferred additive packages and fuel compositions of this invention is such that the fuel composition when consumed in an engine results in improved intake valve cleanliness as compared to intake valve cleanliness of the same engine operated on the same composition except for being devoid of the liquid carrier. Thus in general, the weight ratio of carrier fluid to Mannich base detergent/dispersant on an active ingredient basis, i.e. excluding solvent(s), if any, used in the manufacture of the Mannich base either during or after its formation but before addition of the carrier fluid, will usually fall within the range of about 0.3:1 to about 2.0:1, and preferably within the range of about 0.5:1 to about 1.5:1.

Typically the additive concentrates of this invention contain from about 12 to about 69 wt %, and preferably from about 22 to about 50 wt % of the Mannich base detergent/dispersant on an active ingredient basis. The additive concentrates may also contain carrier fluid, the level of which is determined by the desired carrier to Mannich base detergent/dispersant ratio.

When formulating the fuel compositions of this invention, the Mannich product and carrier fluid (with or without other additives) are employed in amounts sufficient to reduce or inhibit deposit formation in an internal combustion engine. Thus the fuels will contain minor amounts of the Mannich base detergent/dispersant and of the liquid carrier fluid proportioned as above that control or reduce formation of engine deposits, especially intake system deposits, and most especially intake valve deposits in spark-ignition internal combustion engines. Generally speaking the fuels of this invention will contain on an active ingredient basis as defined above, an amount of the Mannich base detergent/dispersant in the range of about 5 to about 300 ptb (pounds by weight of additive per thousand barrels by volume of fuel), and preferably in the range of about 10 to about 200 ptb. In the preferred fuel compositions wherein a liquid carrier fluid is used, the total amount of carrier fluid will preferably be present in an amount of from about 0.3 to about 2.0 parts by weight per part by weight of Mannich detergent/dispersant (on an active ingredient basis), more preferably the carrier fluid will be present in an amount of from about 0.4 to 1.0 parts by weight per one part of Mannich detergent/dispersant.

Other Additives. Other optional additives, such as one or more fuel-soluble antioxidants, demulsifying agents, rust or corrosion inhibitors, metal deactivators, combustion modifiers, alcohol co-solvents, octane improvers, emission reducers, friction modifiers, lubricity additives, ancillary detergent/dispersant additives, biocides, antistatic additives, drag reducing agents, dehazers, anti-knock additives, anti-icing agents, anti-valve seat recession additives, combustion improvers, markers, dyes and multifunctional additives (e.g., methylcyclopentadienyl manganese tricarbonyl and/or other cyclopentadienyl manganese tricarbonyl compounds) can also be included in the fuels and additive concentrates of this invention. Whatever components are selected for use in the compositions of this invention, each component should be present in an amount at least sufficient for it to exert its intended function or functions in the finished fuel composition.

In a preferred embodiment, the additive concentrates additionally contain at least one inert hydrocarbon solvent having a boiling point below about 200 degrees C.

Base Fuels. The base fuels used in formulating the fuels of this invention are any and all base fuels suitable for use in the operation of spark ignition internal combustion engines such as unleaded motor and aviation gasolines, and so-called reformulated gasolines which typically contain both hydrocarbons of the gasoline boiling range and fuel-soluble oxygenated blending components such as alcohols, ethers, and other suitable oxygen-containing organic compounds. Preferred blending agents include fuel-soluble alkanols such as methanol, ethanol, and their higher homologs, and fuel-soluble ethers such as methyl tertiary butyl ether, ethyl tertiary butyl ether, methyl tertiary amyl ether, and analogous compounds, and mixtures of such materials. Oxygenates, when used, will normally be present in the base fuel in an amount below about 25% by volume, and preferably in an amount that provides an oxygen content in the overall fuel in the range of about 0.5 to about 5 percent by volume. However in the practice of this invention departures from these ranges of proportions are permissible whenever deemed necessary, appropriate or desirable.

The additives used in formulating the preferred fuels of this invention can be blended into the base fuel individually or in various sub-combinations. However, it is preferable to blend all of the components concurrently using an additive concentrate of this invention as this takes advantage of the mutual compatibility afforded by the combination of ingredients when in the form of an additive concentrate. Also use of a concentrate reduces blending time and lessens the possibility of blending errors.

Deposit Formation Control In Internal Combustion Engines. The fuel additives of the present invention are useful for controlling (i.e., preventing and/or removing) deposits in spark-ignited and compression (e.g. diesel) internal combustion engines. Although research in the field has tended to focus primarily on intake valve deposit concerns, and also combustion chamber deposits to some extent, the fuel additives of the present invention have been found to be more versatile. They not only can be used to prevent/remove deposits in intake valves, but also have been discovered to be effective in controlling deposits in so-called "cooler" engine regions, such as the port fuel injector in particular. Another application is to prevent gasoline direct injector plugging.

Deposits that form on intake valves and ports can reduce engine power because they may restrict air flow and alter air flow patterns within the cylinder. Cold-start and warm-up driveability also may be adversely affected and exhaust emissions may increase. Other valve deposit problems at intake valves include valve sticking and burned valves. The fuel additives of the present invention are effective in controlling these types of deposits.

Combustion chambers are another engine region of concern for deposit formation. Combustion chamber deposits can increase octane number requirement (ONR), as they tend to increase combustion temperatures and compression ratio. If the engine's ONR increases too much from combustion chamber deposit formation, then the recommended gasoline AKI may not prevent knocking or a loss of power that may accompany knock suppression in vehicles equipped with a knock sensor. Combustion chamber deposit interference (CCDI) and combustion chamber deposit flaking (CCDF) are additional engine deposit problems that can occur in some engines. CCDI may manifest itself as cold engine banging noise, resulting from physical contact between engine deposits on the piston top and cylinder head in some engine designs. CCDF occurs when combustion chamber deposits flake off and lodge between the valve face and valve seat, causing low compression pressures due to poor valve sealing. The fuel additives of the present invention also are effective in controlling these types of deposits.

Fuel injectors and carburetors also are regions of concern where deposit formation can occur. Deposits in the small fuel passages of fuel injectors, such as injector pintle deposits, can reduce fuel flow and alter the spray pattern, which can adversely affect power, fuel economy, and driveability. Deposits can cause similar problems for carbureted engines as carburetors also use small channels and orifices to meter fuel. The fuel additives of the present invention additionally are effective in controlling these types of deposits.

As indicated, the fuel additives of the present invention also have been discovered to be effective in controlling deposits in cooler engine areas. For instance, port fuel injector (PFI) deposits represent another engine area where deposits can occur which impact engine performance. PFI deposits can form, for example, during the hot soak period after the engine has been turned off. Gasoline residue remaining in the injector tip is exposed to an elevated temperature longer than gasoline flowing through the injector normally experiences, which can lead to gasoline degradation that initiates deposit formation. These deposits can restrict fuel flow and disrupt spray pattern by partly obstructing or plugging up metering holes of the gasoline injector tip. The fuel additives of the present invention are effective in controlling these types of deposits that otherwise may arise in cooler engine regions.

The examples that follow are intended to further illustrate, and not limit, embodiments in accordance with the invention. All percentages, ratios, parts, and amounts used and described herein are by weight unless indicated otherwise.

EXAMPLE(S)

Example 1

Procedure for Preparation of 1,2-Diaminocyclohexane-Cresol Mannich ("DAC-C Mannich"). The practice and advantages of this invention are demonstrated by the following examples which are presented for purposes of illustration and not limitation. In each Mannich condensation reaction the following general procedure was used. The Mannich reaction products of the present invention were prepared by reacting 1,2-diaminocyclohexane ("DAC") as a mixture of trans and cis isomers thereof, polyisobutylene-substituted ortho-cresol ("PIB-cresol"), and formaldehyde ("FA"). The PIB-cresol was formed by alkylating ortho-cresol with a polyisobutylene having a number average molecular weight of approximately 900. The DAC, PIB-cresol, and FA were reacted in the following manner in a resin flask equipped with mechanized stirring, nitrogen feed, a Dean-Stark trap, and a heating mantle. Solvent, Aromatic-100, and the PIB-cresol, were introduced to the flask and the mixture was heated to 40° C. along with a slight exotherm. Approximately 75% of the total calculated Aromatic-100 was added at this step. The mixed materials were stirred and heated to 40° C. to blend the components under a nitrogen gas ($N_2$) blanket. The nitrogen gas pressure in the flask was set at approximately 0.1 SCFH. When the mixture became homogenous, the DAC was added. The temperature of the combination was 40-45° C. FA (37%) was added gradually, while vigorous stirring was maintained. A mild exotherm was noted, as the temperature rose to 45-50°

C. The temperature was increased to 80° C. and held for 30 to 60 minutes. The temperature was increased to 145° C. for distillation using a Dean Stark trap. Distillation commenced in about 30 minutes, at a temperature of approximately 95-105° C. Once distillation began, the nitrogen gas flow was adjusted to 0.5 SCFH. The temperature was maintained at 145° C. for about an additional 2 to 2.5 hours. From the total weight of product in the reaction flask after distillation, the amount of additional solvent needed to bring the final package composition to 25% solvent was calculated and added. The mole ratios of DAC:PIB-cresol:FA used in the Mannich reaction were 1.0:1.0:1.0, respectively. For purposes of these descriptions, the Mannich reaction product obtained per this example is identified as "DAC-C Mannich".

Comparison Mannich Products. Mannich reaction products outside of the scope of the present invention were commercially obtained, and included 1,3-DAP Mannich (i.e., 1,3-diaminopropane Mannich), PBC-PA triazine Mannich (i.e., a long chain alkylated ortho-cresol which has been alkylated with polyisobutene-propylamine triazine Mannich), and EDA Mannich (i.e., ethylenediamine Mannich).

Performance Tests. The Mannich reaction product representing the present invention ("DAC-C Mannich"; Example 1) and the comparison Mannich products were subjected to the following performance tests:

I: Intrepid IVD Vehicle Test: intake valve deposit (IVD). This engine cleanliness evaluation IVD test was similar to the standard BMW IVD test (ASTM D 5500) with differences being a Dodge Intrepid engine was used in instead of a BMW engine, and a chassis dyno was used in instead of a road route for mileage accumulations.

II: ASTM D-6421, PFI rig test: port fuel bench test, where the "pass" rate is less than 10% plugging rate;

III: ASTM D-5598, Chrysler Turbocharger PFI test: port fuel injector (PFI) engine test.

These tests provided a direct measure of the level of deposit formation observed to occur in the presence of a particular Mannich detergent. The treat rates and results for the Intrepid IVD vehicle test are reported in Table 1 below.

TABLE 1

| Sample Run | Mannich Additive | Treat (PTB) | IVD (mg) |
|---|---|---|---|
| 1 | DAC-C Mannich | 26 | 0.0 |
| A | 1,3-DAP Mannich | 28.8 | 35.1 |
| B | PBC-PA Triazine Mannich | 28.8 | 32.3 |
| C | 1,3-DAP Mannich | 28.8 | 77.2 |
| D | EDA Mannich | 25.6 | 40.1 |

The treat rates and results for the ASTM D-6421, PFI rig test, are reported in Table 2 below.

TABLE 2

| Sample Run | Mannich Additive | Treat (PTB) | PFI Deposits (plugging rate, %) |
|---|---|---|---|
| 2 | DAC-C Mannich | 41.8 | 2.5 |
| E | EDA Mannich | 41.8 | 21.8 |
| F | 1,3-DAP Mannich | 41.8 | 17.1 |

As can be seen in the results in Tables 1-2, the reaction product representing the present invention (DAC-C Mannich) showed superior and better detergency in the IVD and PFI rig tests as compared to the commercial Mannich products, as shown by the relatively lower amount of deposit formation encountered with the Mannich product of Example 1.

The effectiveness of the Mannich reaction product representing the present invention was also assessed in the ASTM D-5598, Chrysler Turbocharger PFI engine in a regular unleaded fuel. The base fuel without the additive was also tested. The results are provided in Table 3 below.

TABLE 3

| Sample Run | Mannich Additive | Treat (PTB) | PFI Deposits (plugging rate, %) |
|---|---|---|---|
| 3 | DAC-C Mannich | 80 | 0.42 |
| G | Base fuel | None | >5 |

It is clear, upon examination of the above tables, that the Mannich reaction product representing the present invention (DAC-C Mannich) exhibited superior and improved performance in the engine test as demonstrated by the reduced amounts of PFI deposits obtained by using it as compared to the commercial Mannich products or the untreated base fuel.

Example 2

Additional Mannich reaction products were prepared in a similar manner as described for the DAC-C Mannich in Example 1 at the following reactant mole ratios. Sample 4: 1.0:1.0:1.0 DAC:PIB-cresol:FA, and Sample 5: 1.0:2.0:2.0 DAC:PIB-cresol:FA, respectively. Performance Test. The Mannich reaction products of Samples 4 and 5 were each subjected to an M102E (CEC-05-A-93) engine cleanliness evaluation test. The untreated base fuel was also separately tested using the same standard engine test (Sample F).

The treat rates (based on solids content) and results for the M102E (CEC-05-A-93) tests are reported in Table 4 below.

TABLE 4

| Sample Run | Treat (PTB) | IVD (mg) |
|---|---|---|
| 4 | 38.8 | 27.2 |
| 5 | 38.8 | 38.5 |
| F | 0 | 405.9 |

As can be seen in the results of Table 4, the Sample 4 and 5 Mannich reaction products representing the present invention showed superior and better detergency in the IVD test as compared to the untreated base fuel (Sample F), as shown by their significantly lower amounts of deposit formation. Mannich reaction products representing the present invention have been observed to provide better stain rate when compared to a commercial Mannich additive product.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as a Mannich condensation reaction) or in forming a desired composition (such as an additive concentrate or additized fuel blend). It will also be recognized that the additive components can be added or blended into or with the base fuels individually per se and/or as components used in forming preformed additive combinations and/or sub-combinations. Likewise preformed additive concentrates, in which higher proportions of the additive components are blended together usually with one or more diluents or solvents, can be formed so that subsequently the concentrate can be blended with a base fuel in the course of forming the finished fuel composition. Accordingly, even though the claims hereinafter may refer to substances, components and/or ingredients in the present tense ("comprises", "is", etc.), the reference is to the substance, component or ingredient as it exists or may have existed at the time just before it was first blended or mixed with one or more other substances, components and/or ingredients in accordance with the present disclosure. The fact that the substance, component or ingredient may have lost its original identity through a chemical reaction or transformation during the course of such blending or mixing operations is thus wholly immaterial for an accurate understanding and appreciation of this disclosure and the claims thereof.

As used herein the term "fuel-soluble" means that the substance under discussion should be sufficiently soluble at 20° C. in the base fuel selected for use to reach at least the minimum concentration required to enable the substance to serve its intended function. Preferably the substance will have a substantially greater solubility in the base fuel than this. However, the substance need not dissolve in the base fuel in all proportions.

Each and every patent or other publication referred to in any portion of this specification is incorporated in toto into this disclosure by reference for all purposes, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. Fuel additive composition, comprising
   (a) a Mannich reaction product obtained by reacting (i) a polyamine having at least two amino groups where at least one of the amino groups is a primary amino group physically-sterically-protected to hinder its ability to participate in the Mannich reaction via a sterically hindering hydrocarbyl group bonded to the same carbon atom from which the at least one amino group is bonded, (ii) a hydrocarbyl-substituted hydroxyaromatic compound, and (iii) an aldehyde;
   (b) a liquid carrier; and
   wherein the polyamine has a structure selected from one of

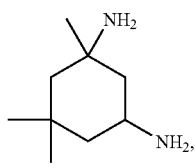

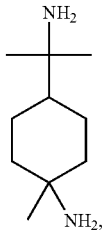

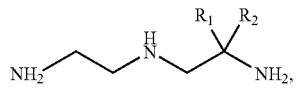

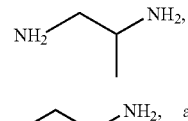

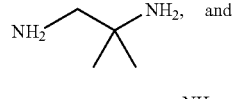

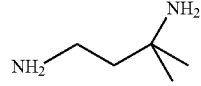

wherein $R_1$ and $R_2$ are selected from hydrocarbyl groups.

2. The fuel additive composition according to claim 1, wherein the mole ratio of (i), (ii) and (iii) is, 0.6-1.4:0.6-1.4:0.6-1.4, respectively.

3. The fuel additive composition according to claim 1, wherein the mole ratio of (i), (ii) and (iii) is, 0.9-1.1:0.9-1.1:0.9-1.1, respectively.

4. The fuel additive composition according to claim 1, wherein the hydrocarbyl-substituted hydroxyaromatic compound comprises ortho-cresol, or phenol, or mixture of o-cresol and phenol, having an aliphatic hydrocarbyl substituent derived from a polyolefin having an average molecular weight in the range of about 300 to about 2000.

5. The fuel additive composition according to claim 4, wherein the aliphatic hydrocarbyl substituent comprises polyisobutylene.

6. The fuel additive composition according to claim 1, wherein the carrier is selected from the group consisting of liquid poly-α-olefin oligomers, liquid polyalkene hydrocarbons, liquid hydrotreated polyalkene hydrocarbons, mineral oils, liquid poly(oxyalkylene) compounds, and any mixture thereof.

7. A Mannich detergent comprising the reaction product of 1) a polyamine 2) polyisobutylene-substituted cresol and/or phenol wherein the polyisobutylene has an average molecular weight of about 300 to about 2,000, and 3) formaldehyde; and wherein the polyamine has a structure selected from one of

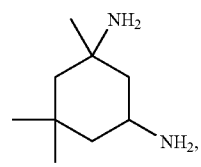

-continued

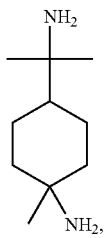
A2

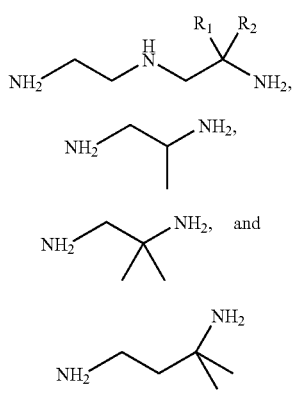
A3
A4
A5
A6 wherein $R_1$ and $R_2$ are selected from hydrocarbyl groups.

8. A fuel composition for an internal combustion engine, comprising
(a) in major amount, a spark-ignitable combustible hydrocarbon fuel; and
(b) in minor amount, a fuel additive composition comprising a Mannich reaction product obtained by reacting (i) a polyamine having at least two amino groups where at least one amino group is a primary amino group physically-sterically-protected to hinder its ability to participate in the Mannich reaction, (ii) a hydrocarbyl-substituted hydroxyaromatic compound, and (iii) an aldehyde, wherein the Mannich reaction product is present in an amount sufficient to reduce the weight amount of engine deposits in an internal combustion engine operated on the fuel composition; and wherein the polyamine has a structure selected from one of

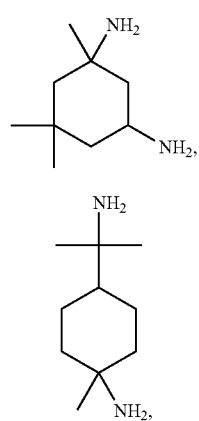
A1
A2

-continued

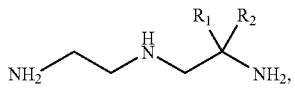
A3

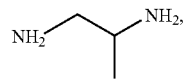
A4

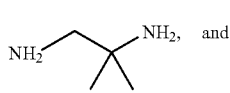
A5

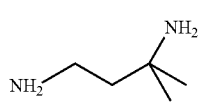
A6 wherein $R_1$ and $R_2$ are selected from hydrocarbyl groups.

9. The fuel composition of claim 8, comprising the fuel additive composition in an amount ranging from about 100 to about 1,000 ppm.

10. The fuel composition of claim 8, wherein the Mannich reaction product is obtained by reacting (1) the polyamine (2) polyisobutylene-substituted cresol and/or phenol or their mixture wherein the polyisobutylene has an average molecular weight of about 300 to about 2,000, and (3) formaldehyde.

11. The fuel composition of claim 8, further comprising at least one additive selected from the group consisting of antioxidants, carrier fluid, demulsifying agents, rust or corrosion inhibitors, metal deactivators, combustion modifiers, alcohol co-solvents, octane improvers, emission reducers, friction modifiers, lubricity additives, ancillary detergent/dispersant additives, biocides, antistatic additives, drag reducing agents, dehazers, anti-knock additives, anti-icing agents, anti-valve seat recession additives, combustion improvers, markers, and dyes.

12. A method of controlling engine deposits in an internal combustion engine comprising operating said engine on said fuel composition of claim 8.

13. The method of claim 12, wherein the controlled engine deposits comprise intake valve deposits.

14. The method of claim 12, wherein the controlled engine deposits comprise port fuel injector deposits.

15. The method of claim 12, wherein the controlled engine deposits comprise combustion chamber deposits.

16. The method of claim 12, wherein the controlled engine deposits comprise intake port stains.

17. The method of claim 12, where the controlled engine deposits comprise direct injector plugging.

* * * * *